United States Patent
Frost

(10) Patent No.: US 6,241,304 B1
(45) Date of Patent: *Jun. 5, 2001

(54) VEHICLE WINDOW

(75) Inventor: Mark Robert Frost, Chorley (GB)

(73) Assignee: Pilkington Automotive UK Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/299,036

(22) Filed: Apr. 23, 1999

Related U.S. Application Data

(63) Continuation of application No. PCT/GB97/02787, filed on Oct. 24, 1997, and a continuation-in-part of application No. 08/957,592, filed on Oct. 24, 1997, now Pat. No. 6,022,063.

(30) Foreign Application Priority Data

Oct. 26, 1996 (GB) .................................. 9622337

(51) Int. Cl.[7] ........................................ B60J 1/02
(52) U.S. Cl. ............... 296/96.21; 296/84.1; 296/146.15; 52/208
(58) Field of Search ........................ 296/146.1, 146.15, 296/84.1, 85, 90, 95, 96.21, 201; 52/208, 204.591, 204.62

(56) References Cited

U.S. PATENT DOCUMENTS

| | | | |
|---|---|---|---|
| 4,910,071 | * 3/1990 | Kunert | 296/96.21 X |
| 4,938,521 | * 7/1990 | Kunert | 296/96.21 |
| 5,137,770 | * 8/1992 | Rothe et al. | 296/84.1 X |
| 5,149,168 | * 9/1992 | Yada et al. | 296/201 |
| 5,261,718 | * 11/1993 | Ohlenforst et al. | 296/96.21 |
| 5,316,829 | * 5/1994 | Cordes et al. | 296/84.1 X |
| 5,443,673 | * 8/1995 | Fisher et al. | 296/84.1 X |
| 5,519,979 | * 5/1996 | Kunert et al. | 296/146.15 X |
| 5,558,387 | * 9/1996 | Sumida et al. | 296/96.21 X |
| 5,603,546 | * 2/1997 | Desir, Sr. | 296/146.15 X |
| 5,695,236 | * 12/1997 | Banno et al. | 296/96.21 X |
| 5,927,040 | * 7/1999 | Kuwabara | 296/93 X |

FOREIGN PATENT DOCUMENTS

2147244 * 5/1985 (GB) .

* cited by examiner

Primary Examiner—D. Glenn Dayoan
Assistant Examiner—Jason Morrow
(74) Attorney, Agent, or Firm—Marshall & Melhorn, LLC

(57) ABSTRACT

A vehicle window for mounting in an aperture in a vehicle body includes a glass pane having inner and outer faces provided with a polymer profile extending along at least a substantial part of at least one edge of the pane and adhering to the inner face thereof. The profile projects a predetermined distance from the inner face, and includes structure for locating the window relative to the aperture during assembly of the vehicle, wherein at least part of at least one edge of the pane is free of the at least one polymer profile. Optionally, the window may additionally include at least one preformed finishing member extending along an edge of the pane, and/or at least one polymeric distance piece for spacing the window from the vehicle bodywork.

20 Claims, 5 Drawing Sheets

VEHICLE WINDOW

RELATED APPLICATION

This application is a continuation of International Application No. PCT/GB97/02787, filed Oct. 24, 1997, and is a continuation in part of U.S. Application Ser. No. 08/957,592 filed Oct. 24, 1997, which issued on Feb. 8, 2000 as U.S. Pat. No. 6,022,063, each of which is incorporated herein by reference.

BACKGROUND OF THE INVENTION

The invention relates to vehicle windows, and especially to vehicle windows provided with a polymer profile on or adjacent at least one edge thereof.

Traditionally, fixed (i.e. non-opening) vehicle windows were glazed using a gasket which both fitted over the edge of the glass to hold it in position and engaged the bodywork of the vehicle. Such gaskets typically had an "H" section with the glass fitting into one recess of the "H" and the opposed recess of the "H" section engaged over a metal flange formed in the vehicle bodywork and extending around the periphery of the window aperture.

More recently, it has been common to glaze fixed vehicle windows adhesively, using a modem adhesive to bond the window to the metal bodywork. In this way, a rigid bond can be formed between window and body, with the window supplementing the strength and stiffness of the vehicle body. To provide an aesthetically pleasing trim, polymer profiles have been bonded to the glass to form a frame (i.e. a continuous, endless, ring) around the periphery of the window, with the adhesive used to bond the window to the car applied between the vehicle body and the polymer profile. More recently, it has been proposed to apply the adhesive directly between the vehicle body and the glass surface immediately inside the frame around the window formed by the polymer profile.

Polymer profiles used in bonded glazing systems may be preformed and then bonded to the window surface, or be produced in situ on the glass either by encapsulation (a process in which the window is placed in a mold which defines the required shape for the polymer profile around the periphery of the glass, and the required solid polymer precursor introduced into the mold cavity in liquid form and cured in situ on the glass), or by extrusion from a suitable shaped nozzle which is advanced around the periphery of the window to form the required frame.

The polymeric profile frames bonded to the vehicle window may serve a variety of functions. For example, in addition to (optionally) providing a "bed" on the glass to receive adhesive for bonding the glazing to the car, they may include inner and/or outer dams for limiting the spread of such adhesive, and distance elements for controlling the distance between the internal surface of the window and the opposing surface of the vehicle bodywork to which the window is to be bonded by adhesive. The frame may project beyond the edge of the glass into contact with vehicle bodywork opposing the edge face of the glass, thereby positioning the window positively within the aperture (see, for example, EP 0 121 480A, FIG. 3, and EP 0 545 896B).

However, providing a polymeric profile in the form of a frame around the periphery of the window requires significant quantities of polymer material (which may be costly) and, if the frame is provided by direct extrusion of the polymer material onto the surface of the window, requires rectification of the joint where the frame is completed, which is liable to be a time-consuming and hence expensive process. Rectification refers to the process of making good the join between the start and end of the extrusion, i.e. making it uniform and hence not readily detectable.

SUMMARY OF THE INVENTION

It has now been found that the important advantages of the prior art profile frames may be achieved without using a frame, by providing a polymer profile along one or more, e.g. two, edges of the window, but leaving part of the periphery of the window free of polymer profile.

According to the present invention, there is provided a vehicle window for mounting in an aperture in a vehicle body, the window comprising a glass pane having inner and outer faces provided with a polymer profile extending along at least a substantial part of at least one edge of the pane and adhering to the inner face thereof, said profile projecting a predetermined distance from the inner face, and locating means for locating the window relative to the aperture during assembly of the vehicle, wherein at least part of at least one edge of the pane is free of the at least one polymer profile. The profile preferably extends along the full length, or substantially the full length, of the respective edge of the window but in some circumstances a smaller length may be desirable or acceptable.

Preferably the window includes at least two polymer profiles, wherein the polymer profiles are formed in situ on the glass pane, and at least one preformed finishing member extends along an edge of the pane substantially all the way from one polymer profile to the other polymer profile. More preferably, the preformed finishing member extends along substantially all of the edges and parts of edges free of the polymer profile.

It will be appreciated that by obviating the need to provide a continuous frame of profile, the hitherto burdensome need for a rectification step is avoided.

The locating means for the window may be included in and be provided by the polymer profile or it may be provided as a separate member, additional to the polymer profile.

Preferably the profile along at least one edge of the window projects beyond that edge.

The projection of the profile beyond the edge of the window may be shaped to engage a surface of the vehicle body opposed to the edge face of the glass, and the profile may serve to locate the window (in at least one direction) within the aperture in the vehicle. The profile may also serve as a dust/weather seal between the edge of the glass and the adjacent bodywork.

The profile may be applied along at least the lower edge of the window, so it serves to support the window in the required position. When the profile is applied along two opposed edges, the profile may be the same or different on the two opposed edges, depending on the position and application of the window. When the profile is applied along two adjacent edges, the profile is preferably the same on those two edges and is preferably continuous along those edges and round the corner between them.

Advantageously, the window may further comprise one or more polymeric distance pieces, adhered to the inner face of the glass pane, and spaced from the polymer profile along the peripheral margin of the window, the polymer profile(s) and distance piece(s) providing means for spacing the inner face of the window from the opposed surface of the vehicle bodywork when the window is bonded in position in the vehicle body.

The number and location of polymeric distance pieces used will depend on the shape and dimensions of the window. Usually at least one polymeric distance piece will be used on each edge of the window not provided with a polymeric profile extending along the edge, although longer edges may require two or more distance pieces and it may be unnecessary to provide any distance pieces along shorter edges.

One or more of the distance pieces may be shaped to co-operate with features of the vehicle body to locate the window in position within the window aperture; i.e. the distance pieces may constitute a locating means.

BRIEF DESCRIPTION OF THE DRAWINGS

In order that the invention may be better understood, embodiments thereof will now be described by way of illustration and example with reference to the accompanying drawings, in which.

DESCRIPTION OF THE PREFERRED EMBODIMENTS

Figure 1:
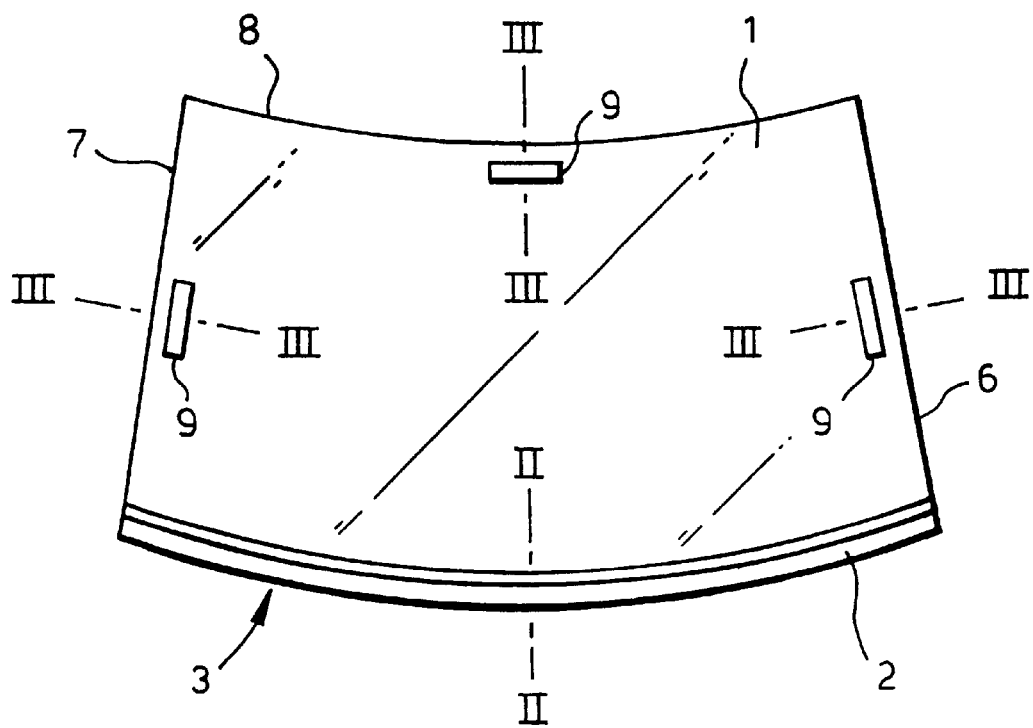
FIG. 1 is a schematic representation of a vehicle window having a profile along one edge.
Figure 2:
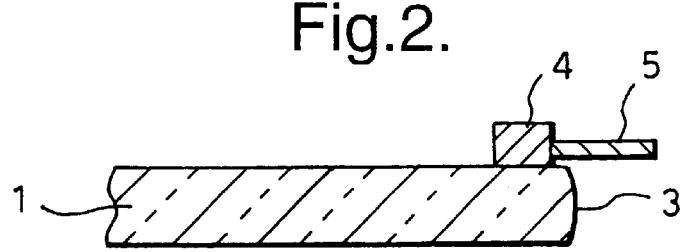
FIG. 2 is a schematic section along the line II—II in FIG. 1.
Figure 3:
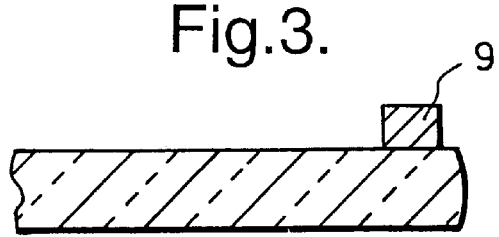
FIG. 3 is a schematic section along the line III—III in FIG. 1.

Referring first to FIG. 1, there is shown a vehicle window comprising a glass pane 1 (which may be laminated or toughened) having a polymer profile 2 extending along its bottom or lower edge 3. The cross-sectional form of the profile 2 is shown in FIG. 2 and comprises a block-like element 4 and a lip 5 which projects beyond the edge 3 of the window. This projection of the profile is shaped to engage a surface opposed to the edge face of the window when installed in the vehicle and in particular is shaped and dimensioned to support the window in the required position within the window aperture in the vehicle bodywork. The profile adheres to and projects from the inner face of the window and is formed by extrusion in situ onto the window in a manner known per se. In the FIG. 1 embodiment the two side edges 6 and 7 and the top or upper edge 8 of the window do not carry a polymer profile like the lower edge 3 but have a polymeric distance piece 9 located about half-way along the length of the respective side. These distance pieces have a cross-sectional form as shown in FIG. 3 which is similar to that of the block element 4 of the polymer profile 2. However, the distance pieces 9 are relatively short in length occupying only a small proportion of the length of the side near which they are located. The distance pieces 9 are adhered to and project from the inner face of the vehicle window 1 and are formed by extrusion in situ on to the window in a manner known per se. The distance pieces 9, or at least one of them, are designed to co-operate with a feature in the vehicle body to position the window within the window aperture. It will be seen that the distance pieces 9 are spaced from the profile 2 along the peripheral margin of the window and the profile 2 and distance pieces 9 provide means for spacing the inner face of the window from the opposed surface of the vehicle bodywork when the window is bonded in position in the vehicle body.

Figure 4:
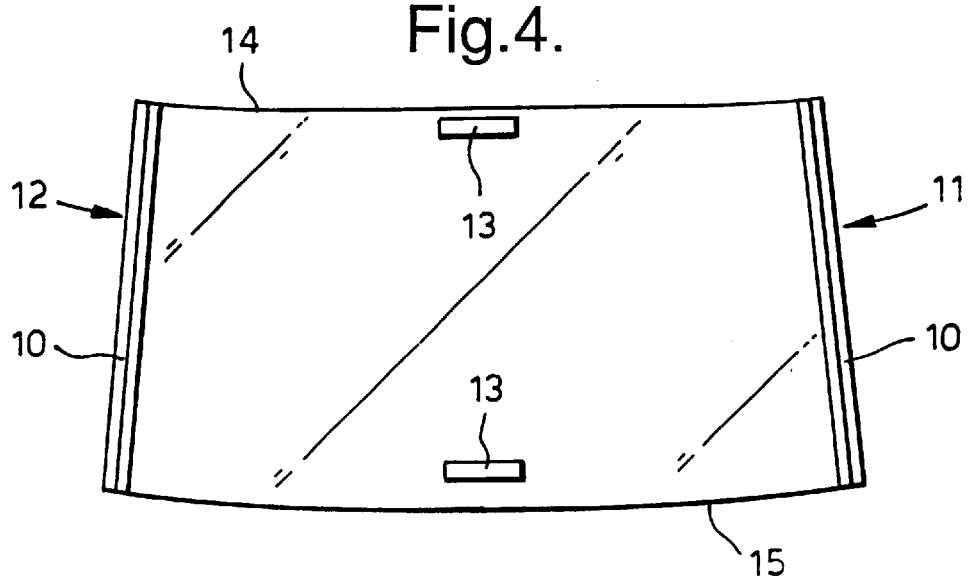
FIG. 4 is a schematic representation of a vehicle window having identical profiles along two opposed edges.

The embodiment shown in FIG. 4 has a polymer profile 10 extending along each of the side edges 11 and 12 of the window, the profiles being identical and of the same form as shown in FIG. 2. A polymeric distance piece 13, of the same form as shown in FIG. 3, is located mid-way along each of the respective upper and lower edges 14 and 15 of the vehicle window.

Figure 5:
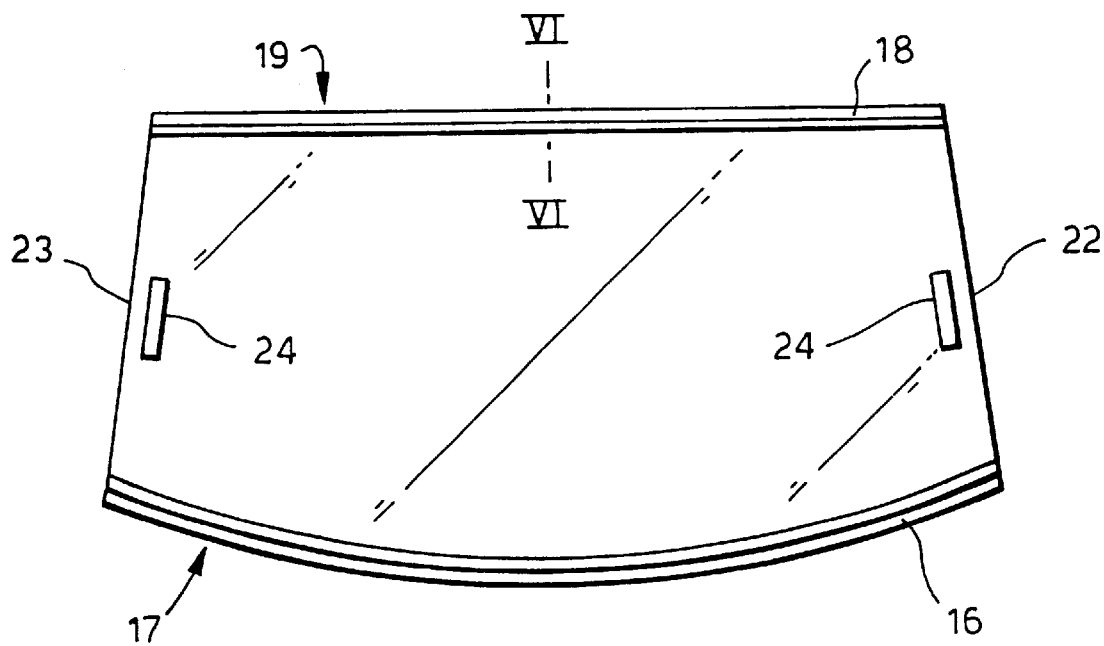
FIG. 5 is a schematic representation of a vehicle window having different profiles along two opposed edges.
Figure 6:
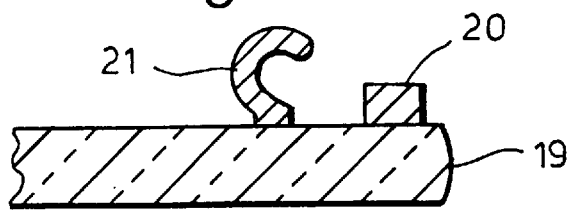
FIG. 6 is a schematic section along the line VI—VI in FIG. 5.

The embodiment shown in FIG. 5 has a polymer profile 16 extending along the lower or bottom edge 17 of the vehicle window and a polymer profile 18 extending along the upper edge 19. In this case, however, the respective profiles 16 and 18 are different. The profile 16 is of cross-sectional form as shown in FIG. 2 and already described but the profile 18 is of cross-sectional form as shown in FIG. 6 having a block-like element 20 and a curved element 21 both of which project from the inner surface, i.e. inwardly from the edge of the window (or upwardly as viewed in FIG. 6). The side edges 22 and 23 of the window have respective distance pieces 24 as already described in relation to the FIG. 1 embodiment.

Figure 7:
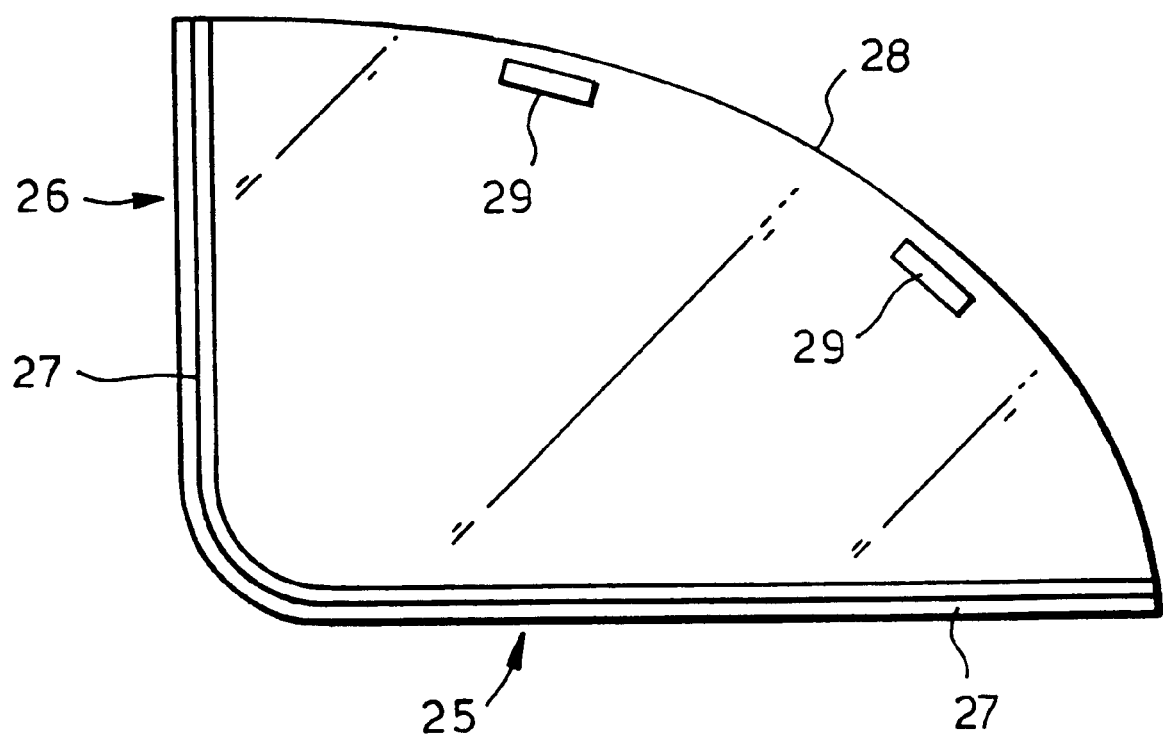
FIG. 7 is a schematic representation of a vehicle window having identical profiles along two adjacent edges.

FIG. 7 shows an effectively three sided window embodiment as distinct from the four sided windows of FIGS. 1, 4 and 5. In the FIG. 7 embodiment the lower edge 25 and the side edge 26 have a polymer profile 27 which is identical, of the same form as shown in FIG. 2, along each of those edges and actually continuous running round the corner between those edges.

The third side 28 of the window is curved and two polymeric distance pieces 29 are provided at spaced locations along that edge. The form of the distance pieces is as already described in relation to the previous embodiments.

Figure 8:
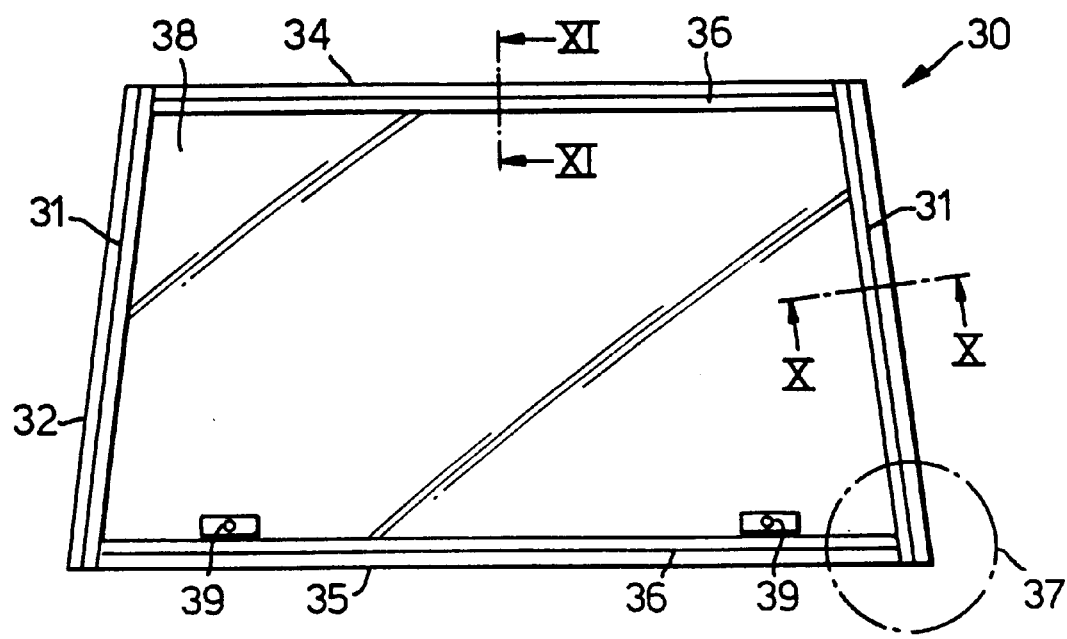
FIG. 8 is a schematic representation of a vehicle window having polymer profiles along two opposed edges, and preformed finishing members along the two opposed edges not having polymer profiles.

FIG. 8 shows a further version of the window of FIG. 4, i.e. it is provided with identical polymer profiles 31 on the two opposed side edges 32,33 of the window 30. However, the top and bottom edges 34,35, instead of carrying distance pieces, are provided with preformed finishing members 36 which extend substantially all the way from one polymer profile (e.g. on edge 32) to the other polymer profile (e.g. on edge 33). The window includes a glass pane 38.

Ideally, the finishing member 36 abuts tightly against the polymer profile 31, but in practice, variations in assembly need to be accommodated and so a small gap may be left. Circle 37 indicates a corner portion of the window which is greatly enlarged in FIG. 9.

Figure 9:
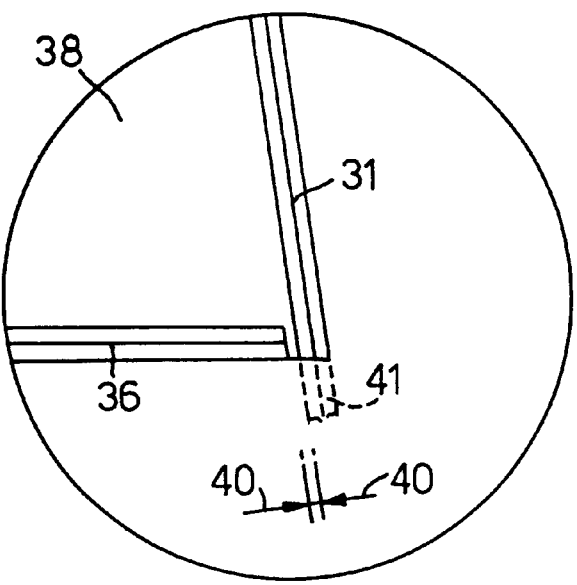
FIG. 9 is an enlargement of a small portion of FIG. 8.

In FIG. 9, the gap between polymer profile 31 and preformed finishing member 36 is denoted by arrows 40. The gap should be small, preferably less than 3 mm, more preferably less than 2 mm and most preferably less than 1 mm. During manufacture of the window, polymer profile 31 is preferably extruded directly onto the glass pane. Since the extrusion does not generally start neatly, i.e. the initial tip of an extruded profile is generally not of the exact form desired, it is preferable to commence extrusion off the glass pane, i.e. a short distance from the edge of the pane, and initially extrude polymer onto some other surface. This initial portion is preferably an extrapolation of the desired profile, so that the extrusion nozzle (which is normally advanced by a robot) passes without interruption along the desired trajectory along the edge of the glass pane. The polymer profile is correspondingly deposited without interruption. A similar procedure may be adopted at the end of the extrusion operation, i.e. extrusion of the profile is continued until it is off the glass. The excess portion of polymer profile, denoted as 41 in FIG. 9, is then trimmed, i.e. by cutting with a sharp knife, to leave a neat finish.

Next, the preformed finishing member 36 is placed in position at one end tightly adjacent the polymer profile, and laid in position along the appropriate edge of the glass pane. The member may be supplied as a pre-cut length, but in either case, the small gap 40 may result from variations in its length and position. The member may be fixed in place with double-sided adhesive tape.

Referring again to FIG. 8, locating means are provided in the form of pins 39, mounted on blocks which are also adhered to the glass pane with double-sided adhesive tape. These pins locate in holes or recesses provided in the mounting flange of the vehicle bodywork, and ensure that the window is correctly positioned relative to the window aperture. The locating function of the pins 39 is generally similar to that of the distance pieces 9 described above, but the pins do not have the additional spacing function of the distance pieces. Where the locating function is carried out by the polymer profile itself, the pins are obviously not required.

Figure 10:
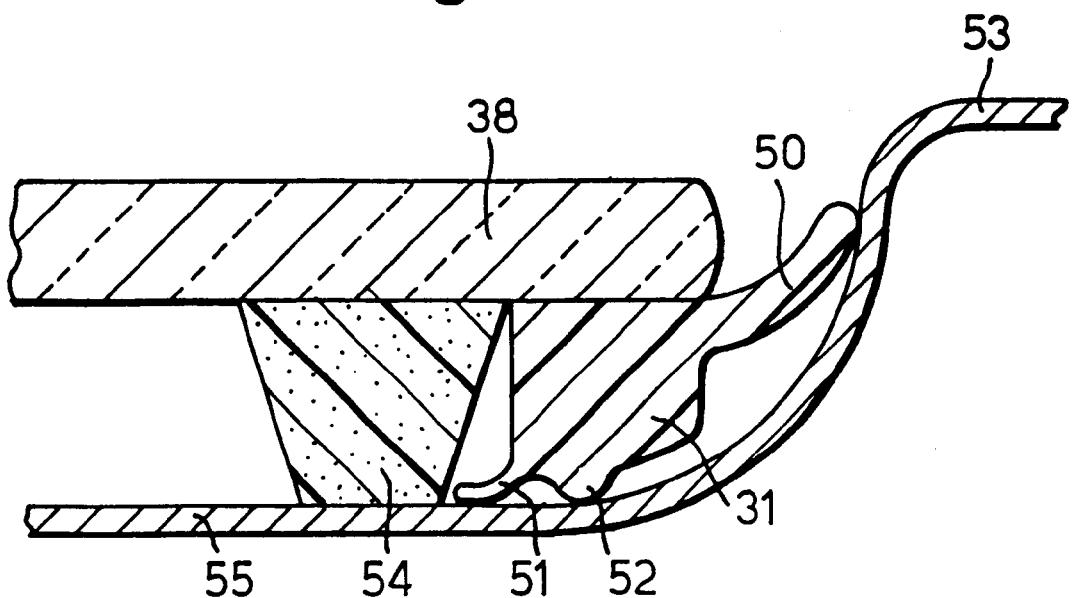
FIG. 10 is a schematic section along the line X—X in FIG. 8.

Referring now to FIG. 10, a cross-section along the line X—X is shown. FIG. 10 additionally shows part of the vehicle bodywork, not shown in FIG. 8. The polymer profile 31 includes a first lip 50, a second lip 51 and a spacing portion 52. The first lip 50 serves to provide an at least partial seal against dirt, water etc. by pressing against the vehicle body work 53, and may contribute to the external appearance of the vehicle. An absolute seal against water ingress is provided by the adhesive 54 which is used to bond the window to the mounting flange 55 of the vehicle bodywork. The second lip 51 also provides a partial seal against the vehicle bodywork, and alleviates the problem of excess adhesive being squeezed past the polymer profile when the window is inserted in the vehicle. However, both first and second lips are not essential, and may be omitted if desired.

The spacing portion 52 serves to ensure that the inner face of the window is correctly spaced from the opposed surface of the vehicle bodywork, namely the mounting flange, when the window is bonded in position in the vehicle body.

Where the polymer profile 31 is provided on at least two opposed edges of the window, no further spacing means is required. Providing that the window is correctly positioned in the aperture, once the adhesive has cured, the window will be maintained in the correct position thereafter by virtue of the adhesive bond.

Figure 11:
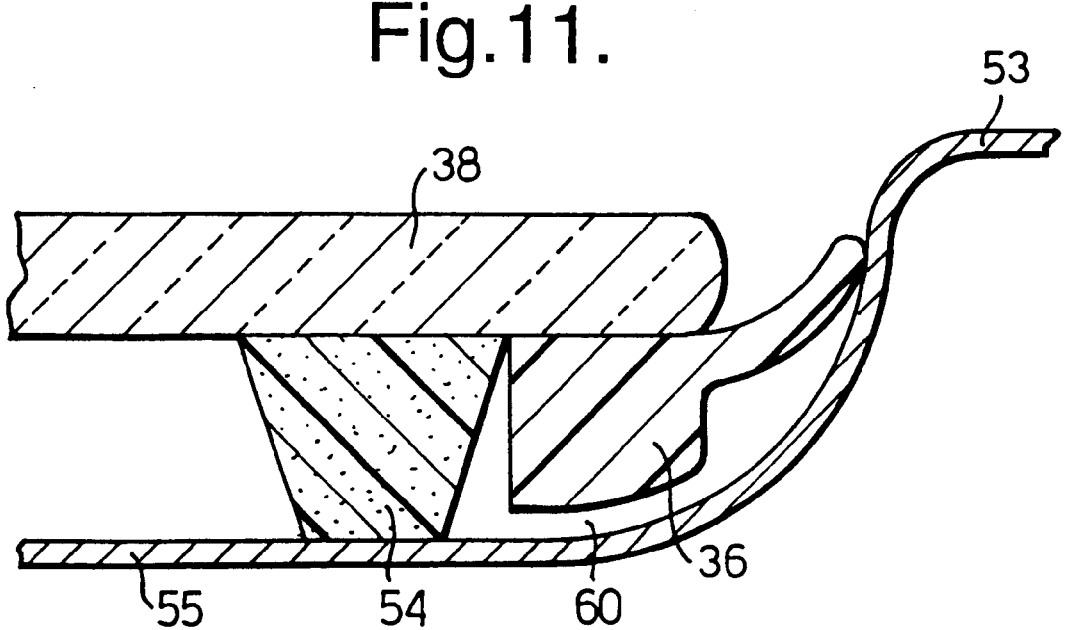
FIG. 11 is a schematic section along the line XI—XI in FIG. 8.

In FIG. 11, a cross-section including the preformed finishing member 36 is shown. The cross-section is taken along the line X]—X] of FIG. 8, but again, additionally shows a part of the vehicle bodywork 53. It will be noted that the finishing member does not carry out a spacing function, hence the existence of the gap 60 between the member 36 and the vehicle bodywork 53. Certain vehicle manufacturers prefer a "trimless" appearance to vehicle windows, and in this case the finishing member may be omitted.

It will be understood, however, that the embodiments described above are by way of illustration and example only and further embodiments of the invention will be readily apparent to those skilled in the art. It will be understood that the window edges may be straight or curved and that the particular shapes of window shown in the drawings are not intended to be limitative and that the invention can find application in any suitable vehicle window, including windscreens, backlights, sidelights and rooflights. The invention may be applied equally well to backlights that are designed for saloon cars as to backlights for tailgates of hatchbacks or estate cars, or rear cargo doors etc..

It will further be appreciated by those skilled in the art that the present invention can provide various advantages over other techniques. Notably less polymer material is required than if a profile is applied round the full periphery and/or on both sides of the window edge, thereby saving expense. Further, the need to spend time on jointing, or rectification of the joint where a full frame is applied, is avoided and instead a simple trimming operation, which may for example be performed by a robot, can be applied to the profile and/or distance piece ends.

What is claimed is:

1. A vehicle window for mounting in an aperture in a vehicle body, the window comprising a glass pane having inner and outer faces and provided with a polymer profile extruded in situ on to the glass pane, the polymer profile extending along at least a substantial part of at least one edge of the pane and adhering to the inner face thereof, said profile projecting a predetermined distance from the inner face, and locating means for locating the window relative to the aperture during assembly of the vehicle, wherein at least part of at least one edge of the pane is free of the polymer profile, and wherein the profile along at least one edge projects beyond the edge of the window the projection of the profile beyond the edge of the window being shaped to engage a surface opposed to the edge face of the window.

2. A vehicle window as claimed in claim 1 having at least two polymer profiles, wherein at least one preformed finishing member extends along an edge of the pane substantially all the way from one polymer profile to the other polymer profile.

3. A vehicle window as claimed in claim 2, wherein the preformed finishing member extends along substantially all of the edges and parts of edges free of the polymer profile.

4. A vehicle window as claimed in claim 1, wherein the locating means is included in and provided by the polymer profile.

5. A vehicle window as claimed in claim 1, wherein the locating means is provided as a separate member, additional to the polymer profile.

6. A vehicle window as claimed in claim 1, wherein the projection of the profile beyond the edge of the window is shaped and dimensioned to support the window in the required position within the window aperture.

7. A vehicle window as claimed in claim 1, wherein the profile extends along the lower edge of the window.

8. A vehicle window for mounting in an aperture in a vehicle body the window comprising: a glass pane having inner and outer faces and provided with a polymer profile extruded in situ on to the glass pane, the polymer profile extending along at least a substantial part of at least one edge of the pane and adhering to the inner face thereof, said profile projecting a predetermined distance from the inner face; locating means for locating the window relative to the aperture during assembly of the vehicle; and at least one polymeric distance piece, adhered to the inner face of the glass pane, and spaced from the polymer profile along the peripheral margin of the window, the polymer profile and the at least one distance piece providing means for spacing the inner face of the window from the opposed surface of the vehicle bodywork when the window is bonded in position in the vehicle body, wherein at least part of at least one edge of the pane is free of the polymer profile.

9. A vehicle window as claimed in claim 8, including at least one polymeric distance piece on each edge of the window not provided with a polymer profile extending along that edge.

10. A vehicle window as claimed in claim 8, wherein the at least one polymeric distance piece is formed by extrusion in situ on to the window.

11. A vehicle window as claimed in claim 8, wherein at least one spaced polymeric distance piece is designed to co-operate with a feature in the vehicle body to position the window within the window aperture.

12. A vehicle window as claimed in claim 1, in which the same profile is applied along two opposed edges.

13. A vehicle window as claimed in claim 1, in which different respective profiles are applied along two opposed edges.

14. A vehicle window as claimed in claim 12, in which the same profile is applied along two adjacent edges.

15. A vehicle window as claimed in claim 9, in which a continuous profile is applied along the two adjacent edges and around the corner between them.

16. A vehicle window provided with a polymer profile extending along at least a substantial part of at least one edge of the window and adhering to the inner face thereof, said profile projecting from the inner face of the window, and at least one polymeric distance piece, adhered to the inner face of the vehicle window, spaced from said profile along the peripheral margin of the window, the polymer profile(s) and distance piece(s) providing means for spacing the inner face of the window from the opposed surface of the vehicle bodywork when the window is bonded in position in the vehicle body.

17. A vehicle window as claimed in claim 1, further comprising at least one polymeric distance piece, adhered to the inner face of the glass pane, and spaced from the polymer profile along the peripheral margin of the window, the polymer profile and the at least one distance piece providing means for spacing the inner face of the window from the opposed surface of the vehicle bodywork when the window is bonded in position in the vehicle body.

18. A vehicle window as claimed in claim 17, including at least one polymeric distance piece on each edge of the window not provided with a polymer profile extending along that edge.

19. A vehicle window as claimed in claim 17, wherein the at least one polymeric distance piece is formed by extrusion in situ on to the window.

20. A vehicle window as claimed in claim 17, wherein at least one spaced polymeric distance piece is designed to co-operate with a feature in the vehicle body to position the window within the window aperture.

* * * * *